United States Patent
Furuichi et al.

(10) Patent No.: US 11,408,739 B2
(45) Date of Patent: Aug. 9, 2022

(54) LOCATION CORRECTION UTILIZING VEHICLE COMMUNICATION NETWORKS

(71) Applicant: International Business Machines Corporation, Armonk, NY (US)

(72) Inventors: Sanehiro Furuichi, Tokyo (JP); Akira Saito, Ichikawa (JP); Hayato Uenohara, Funabashi (JP); Satoshi Yokoyama, Ichikawa (JP)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 16/413,663

(22) Filed: May 16, 2019

(65) Prior Publication Data

US 2020/0363211 A1    Nov. 19, 2020

(51) Int. Cl.
*G01C 21/30* (2006.01)
*G01S 19/13* (2010.01)

(52) U.S. Cl.
CPC .............. *G01C 21/30* (2013.01); *G01S 19/13* (2013.01)

(58) Field of Classification Search
CPC ...... G01C 21/30; G01C 21/005; G01C 21/26; G01C 21/28; G01S 19/13; G01S 19/421; G05B 23/0237; G06K 9/6203; G07C 5/008; H04L 67/12; H04W 4/023
See application file for complete search history.

(56) References Cited

U.S. PATENT DOCUMENTS

| | | |
|---|---|---|
| 7,856,234 B2 | 12/2010 | Alizadeh-Shabdiz |
| 10,168,424 B1 | 1/2019 | Akiyama |
| 10,473,793 B2 * | 11/2019 | Neubecker .............. G01S 19/31 |
| 11,009,365 B2 * | 5/2021 | Wang ...................... G08G 1/167 |
| 2007/0043506 A1 * | 2/2007 | Mudalige .................. B60T 7/22 |
| | | 701/301 |
| 2016/0100290 A1 * | 4/2016 | Smith .................... G01S 5/0263 |
| | | 455/456.1 |

(Continued)

OTHER PUBLICATIONS

Fujii et al., "Cooperative Vehicle Positioning via V2V Communications and Onboard Sensors", printed on Jan. 11, 2019, 5 pages, <https://ipsj.ixsq.nii.ac.jp/ej/?action=repository_action_common_download&item_id=70857&item_no=1&attribute_id=1&file_no=1>.

*Primary Examiner* — Nicholas Kiswanto
*Assistant Examiner* — Danielle Marie Jackson
(74) *Attorney, Agent, or Firm* — Randy E. Tejeda

(57) ABSTRACT

Adjusting inconsistencies and inaccuracies in location perception, one or more computer processors identify data indicating a location of a computing device; detect a subsequent computing device within a threshold proximity to the computing device; receive data indicating a location of the subsequent computing device; determine a first location reliability score for the identified data indicating the location of a computing device and a second location reliability score for the received data indicating the location of the subsequent computing device; calculate one or more location corrective parameters for the computing device based, at least in part, on the identified data indicating the location of the computing device, the received data indicating the location of the subsequent computing device, the first location reliability score, and the second location reliability score; adjust the data indicating the location of the computing device based on the calculated one or more location corrective parameters.

12 Claims, 4 Drawing Sheets

(56) References Cited

U.S. PATENT DOCUMENTS

| | | |
|---|---|---|
| 2016/0305794 A1 | 10/2016 | Horita |
| 2017/0295463 A1* | 10/2017 | Lindquist .............. G01S 5/0205 |
| 2018/0114441 A1* | 4/2018 | Marmet ................ G08G 1/163 |
| 2018/0180422 A1 | 6/2018 | Naito |
| 2018/0231387 A1 | 8/2018 | Thiel |
| 2018/0372855 A1 | 12/2018 | Akiyama |
| 2019/0041223 A1* | 2/2019 | Yang ................... H04W 12/122 |
| 2019/0204838 A1* | 7/2019 | Haque .................... G01S 19/48 |
| 2019/0266810 A1* | 8/2019 | Sato ....................... G07C 5/008 |
| 2020/0003563 A1* | 1/2020 | Miyake ............. G01C 21/3446 |
| 2020/0149908 A1* | 5/2020 | Furuichi ............. G06F 16/9537 |
| 2020/0201674 A1* | 6/2020 | McSchooler ........ G05D 1/0088 |
| 2020/0209883 A1* | 7/2020 | Kim ..................... G05D 1/0055 |
| 2020/0232803 A1* | 7/2020 | Rogan .................... H04W 4/44 |
| 2020/0319351 A1* | 10/2020 | Miyao ................... G01S 19/49 |

\* cited by examiner

LOCATION CORRECTION UTILIZING VEHICLE COMMUNICATION NETWORKS

BACKGROUND

The present invention relates generally to the field of navigation, and more particularly to correcting low accuracy positions and improving computing device location awareness.

A wireless ad hoc network (WANET) or mobile ad hoc network (MANET) is a decentralized type of wireless network. The network is ad hoc because it does not rely on a pre-existing infrastructure, such as routers in wired networks or access points in managed (infrastructure) wireless networks. Instead, each node participates in routing by forwarding data for other nodes, so the determination of which nodes forward data is made dynamically based on network connectivity and the routing algorithm in use. Vehicular ad-hoc networks (VANETs) are created by applying the principles of MANETs. VANETs allow the spontaneous creation of a wireless network for vehicle-to-vehicle (V2V) data exchange. VANETs are critical for car-to-car ad-hoc mobile communication and networking applications, where networks can be formed and information can be relayed among cars. V2V and vehicle-to-roadside communications architectures co-exist in VANETs to provide road safety, navigation, and other roadside services. VANETs support a wide range of applications from simple one hop information dissemination to multi-hop dissemination of messages over vast distances. To support applications for environment perception in VANETs, vehicles send Cooperative Awareness Messages (CAMs) via wireless broadcast to communicate with other vehicles. VANETs can use any wireless networking technology as a communication method, the most prominent being short range radio technologies (e.g., WLAN).

On-board diagnostics (OBD) is an automotive term referring to a vehicle's self-diagnostic and reporting capability. OBD systems give the vehicle owner or repair technician access to the status of the various vehicle subsystems. The amount of diagnostic information available via OBD has varied widely since its introduction in the early 1980s. Early versions of OBD would simply illuminate a malfunction indicator light if a problem was detected but would not provide any information as to the nature of the problem. Modern OBD implementations use a standardized digital communications port to provide real-time data in addition to a standardized series of diagnostic trouble codes (DTCs), which allow one to rapidly identify and remedy malfunctions within the vehicle. OBD information is commonly used by vehicle telematics devices that perform fleet tracking, monitor fuel efficiency, prevent unsafe driving, as well as for remote diagnostics. Although originally not intended for the above purposes, commonly supported OBD data such as vehicle speed, revolutions per minute (RPM), and fuel level allow global position system (GPS) based tracking devices to monitor vehicle idling times, speeding, and over-revving.

SUMMARY

Embodiments of the present invention disclose a method and a computer program product for adjusting inconsistencies and inaccuracies in location perception. The method includes one or more computer processors identifying data indicating a location of a computing device. The one or more computer processors detect a subsequent computing device within a threshold proximity to the computing device. The one or more computer processors receive data indicating a location of the subsequent computing device. The one or more computer processors determine a first location reliability score for the identified data indicating the location of a computing device and a second location reliability score for the received data indicating the location of the subsequent computing device. The one or more computer processors calculate one or more location corrective parameters for the computing device based, at least in part, on the identified data indicating the location of the computing device, the received data indicating the location of the subsequent computing device, the first location reliability score, and the second location reliability score. The one or more computer processors adjust the data indicating the location of the computing device based on the calculated one or more location corrective parameters.

Another embodiment of the present invention discloses a method for adjusting inconsistencies and inaccuracies in location perception utilizing a management server. The method includes a management server monitoring data indicating a location of a computing device. The management server receives data indicating the location from the monitored computing device. The management server receives data indicating a subsequent computing device within a threshold proximity of the computing device. The management server receives data indicating a location of the subsequent computing devices. The management server determines a first location reliability score for the received data indicating the location of the computing device and a second location reliability score for the received data indicating the location of the subsequent computing device. The management server calculates one or more location corrective parameters for the computing device based, at least in part, on the received data indicating the location of the computing device, the received data indicating the location of the subsequent computing device, the first location reliability score, and the second location reliability score. The management server transmits the calculated location corrective parameters to the client computing device.

DETAILED DESCRIPTION

The need for reliable navigation and positional awareness is imperative in numerous industries such as transportation, ride-sharing, and automated/driverless vehicles. The advent of advanced GPS systems and quasi-zenith satellites have significantly improved high-accuracy location calculations and determinations. Although, said systems are not without problems, inaccuracies, and inconsistencies. For example, positional awareness is significantly reduced when traveling in areas where few navigation satellites are within range. In another example, location reliability is drastically affected by the presence of high-rise buildings and skyscrapers. In exceptionally poor signal conditions, for example in urban areas, satellite signals may exhibit multipath propagation where signals skip off structures or are weakened by meteorological conditions or tree canopies. Some standalone GPS navigators, used in poor conditions, struggle to determine positions and location of vehicles due to satellite signal fracture. For example, a standard GPS unit may need as long as 12 minutes (the time needed to download the GPS almanac and ephemerides) to be able to provide a highly accurate location. Furthermore, not all vehicles are capable of operating or utilizing advanced navigation systems such as the quasi-zenith satellite system and image analysis systems capable of identifying locations.

Embodiments of the present invention recognize that positional accuracy and reliability is improved by correcting inconsistencies in vehicle location awareness by utilizing inter-device communication to exchange high accuracy location information. In an embodiment of the present invention, vehicles communicate location and positional information with location transponders that are contained within a proximity distance to transportation paths, surfaces, and/or routes. In an embodiment of the present invention, management servers are utilized to coordinate, store, monitor, and distribute location information and associated user and device data. In another embodiment of the present invention, ad-hoc networks are created and maintain by a plurality of devices, allowing the continual distribution of localized location information. Implementation of embodiments of the invention may take a variety of forms, and exemplary implementation details are discussed subsequently with reference to the Figures.

The present invention will now be described in detail with reference to the Figures.

Figure 1:
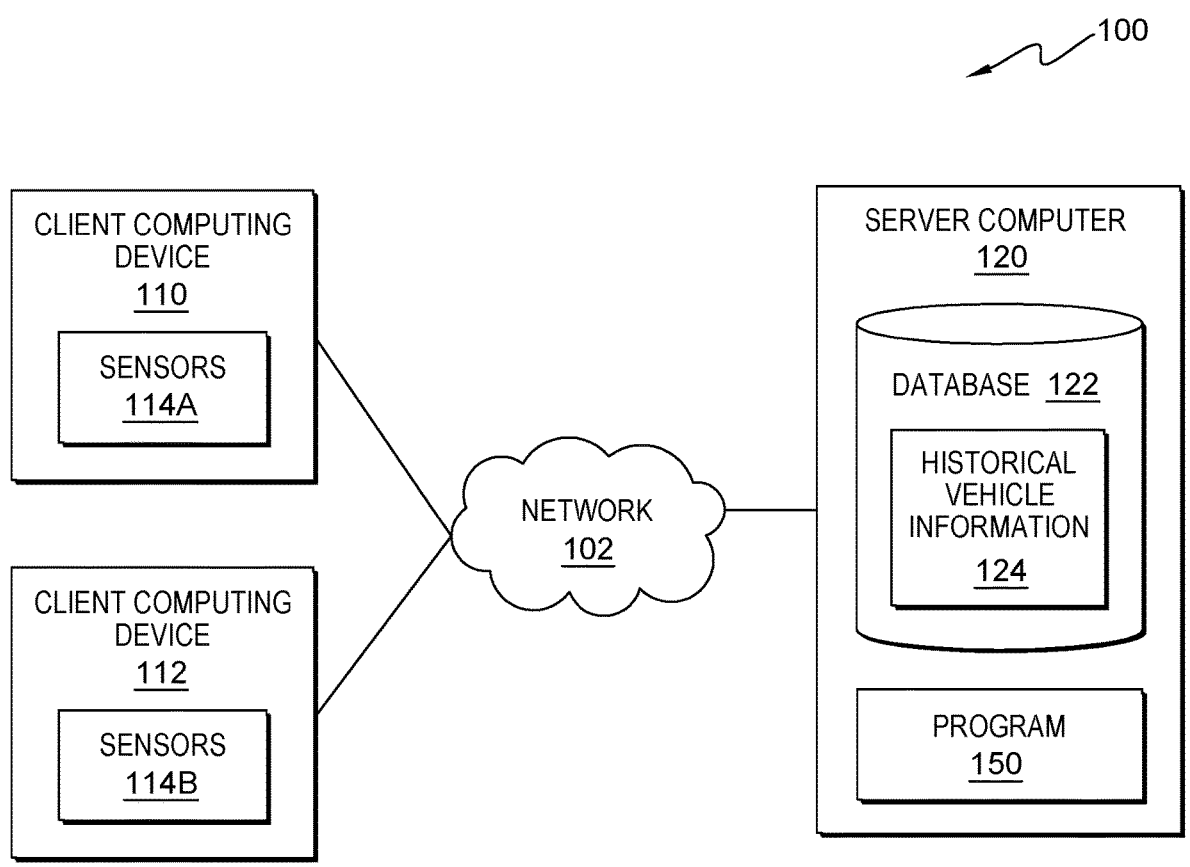
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 110, client computing device 112, and server computer 120 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 110, client computing device 112, server computer 120, and other computing devices (not shown) within distributed data processing environment 100. In various embodiments, network 102 operates locally via wired, wireless, or optical connections and can be any combination of connections and protocols (e.g., personal area network (PAN), near field communication (NFC), laser, infrared, ultrasonic, etc.).

Client computing device 110 and client computing device 112 each may be any electronic device or computing system capable of processing program instructions and receiving and sending data. In some embodiments, client computing device 110 and client computing device 112 each may be a laptop computer, a tablet computer, a netbook computer, a personal computer (PC), a desktop computer, a personal digital assistant (PDA), a smart phone, or any programmable electronic device capable of communicating with network 102. In other embodiments, client computing device 110 and client computing device 112 each may represent a server computing system utilizing multiple computers as a server system, such as in a cloud computing environment. In general, client computing device 110 and client computing device 112 are representative of any electronic device or combination of electronic devices capable of executing machine readable program instructions as described in greater detail with regard to FIG. 4, in accordance with embodiments of the present invention. Client computing device 110 and client computing device 112 contains sensors 114A and sensors 114B, respectively.

Sensors 114A and sensors 114B each may be a device or sensor that is capable of measuring acceleration. Some solid-state accelerometers are based on microelectromechanical systems (MEMS). In various embodiments, accelerometers are able to detect the magnitude and the direction of acceleration/deacceleration, as well as orientation, coordinate acceleration, vibration, and shock. In an example, sensors 114A and sensors 114B each may be capable determining motions changes in 6-axis: X (forward/back, surge), Y (left/right, sway), Z (up/down, heave), yaw, pitch, and roll. In an example, sensors 114A and sensors 114B each may measure sway, roll, and yaw during a cornering maneuver. In the depicted embodiment, sensors 114A and sensors 114B may be located within client computing device 110 and client computing device 112, respectively, however sensors 114A and sensors 114B each may also be located within any number of client computing devices known in the art such as a mobile device, smartwatch, and/or ODB device.

In an embodiment, sensors 114A and sensors 114B each may be a device, receiver, or sensor that is capable of receiving information from GPS satellites and calculating the device's geographical position. In most embodiments, sensors 114A and sensors 114B each has a track algorithm that combines sets of satellite measurements collected at different times. After a set of measurements are processed, the track algorithm predicts the receiver location corresponding to the next set of satellite measurements. When the new measurements are collected, the receiver uses a weighting scheme to combine the new measurements with the tracker prediction. In general, a tracker can (a) improve receiver position and time accuracy, (b) reject bad measurements, and (c) estimate receiver speed and direction. Sensors 114A and sensors 114B each transmit information regarding the user orientation and speed. In an embodiment, sensors 114A and sensors 114B each is augmented through the use of cell tower data to enhance quality and precision. In another embodiments, sensors 114A and sensors 114B include, but not limited to, proximity sensors, sonar (e.g., ultrasonic) capable sensors, lidar capable sensors, electromagnetic sensors (e.g., radio-frequency identification (RFID), etc.) detectors, and/or cameras.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with client computing device 110 and other computing devices (not shown) within distributed data processing environment 100 via network 102. In another embodiment, server computer 120 represents a computing system utilizing clustered computers and components (e.g., database server computers, application server computers, etc.) that act as a single pool of seamless resources when accessed within distributed data processing environment 100. In the depicted embodiment, server computer 120 includes database 122 and program 150. In other embodiments, server computer 120 may contain other applications, databases, programs, etc. which have not been depicted in distributed data processing environment 100. Server computer 120 may include internal and external hardware components, as depicted and described in further detail with respect to FIG. 4.

Database 122 is a repository for data used by program 150. In the depicted embodiment, database 122 resides on server computer 120. In another embodiment, database 122 may reside on client computing device 110 or elsewhere within distributed data processing environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as a geographic information system which integrates, stores, edits, analyzes, shares, and displays geographic information. Additionally, database 122 may also store data used by program 150, including, but not limited to, items on one or more electronic maps. In the depicted embodiment, database 122 contains historical vehicle information 124.

Historical vehicle information 124 is a repository for a plurality of historical and current location information and profiles maintained and utilized by program 150, contained within database 122. In an embodiment, historical vehicle information 124 contains a plurality of different profiles including, but not limited to location, vehicle, device, and user profiles. In a further embodiment, the plurality of profiles includes historical information specific to each profile. For example, an application profile includes historical vehicle utilization, associated statistics, and information as detailed below. In an embodiment, historical vehicle information 124 contains user profiles. A user profile includes information specific to an individual user. Said information may include user geographical information (e.g., country, region, city, town, etc.), related social media geolocational information, user calendar or scheduling information (e.g., future meetings, device utilization, etc.). In another embodiment, a user profile may link or contain associated client computing device (e.g., vehicle) profiles and historical vehicle information. In this embodiment, the user profile includes one or more links to associated devices (i.e., GPS devices, navigation systems, mobile devices, etc.).

In various embodiments, the term "vehicle" should be construed having a broad meaning and should include all types of vehicles. Non-limiting examples of vehicles include: passenger cars, trucks, motorcycles, off-road/all-terrain vehicles, buses, boats, ships, airplanes, helicopters, recreational vehicles, farm vehicles, construction vehicles, trams, golf carts, trains, trolleys, scooters, personal transporters, drones, individuals, and/or associated client computing devices.

In various embodiments, the term "near" should be construed having a broad meaning and should include a plurality of non-limiting definitions and constructs such as pre-defined distance thresholds, objects that are within operating range of a network or communication device, objects that are visually identifiable or otherwise identifiable utilizing one or more techniques known in the art (e.g., electromagnetic identification, etc.).

Program 150 is a program for correcting inconsistencies and inaccuracies in location perception. Program 150 identifies or determines the location or location information from one or more associated client computing devices. In an embodiment, the client computing device may be a vehicle or contained within a vehicle. Responsive to program 150 detecting other client computing devices, program 150 receives and transmits relevant location information and associated accuracy scores. Program 150 determines the reliability of the location information by receiving or requesting a location reliability score associated the other user or the associated client computing device (e.g., vehicle). Program 150 compares the reliability and accuracy of the received location information with the current perceived location of the client computing device of the user. Responsive to receiving more accurate and/or reliable location information, program 150 calculates corrective location parameters based on the determined reliable location information. Program 150 corrects the location of the user, client computing, and/or vehicle based on the calculated corrective parameters. Program 150 logs said location and corrective parameters for future use.

In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on client computing device 110, client computing device 112, and/or any other computing device (not depicted) within distributed data processing environment 100. Program 150 is depicted and described in further detail with respect to FIG. 2.

The present invention may contain various accessible data sources, such as database 122, that may include personal storage devices and content the user wishes not to be used, program 150 allows the user to opt in or opt out of exposing personal information. Program 150 enables the authorized and secure handling of user information, such as tracking information, as well as personal information that may have been obtained, is maintained, and/or is accessible. The user can be provided with notice of the collection of portions of the personal information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

Figure 2:
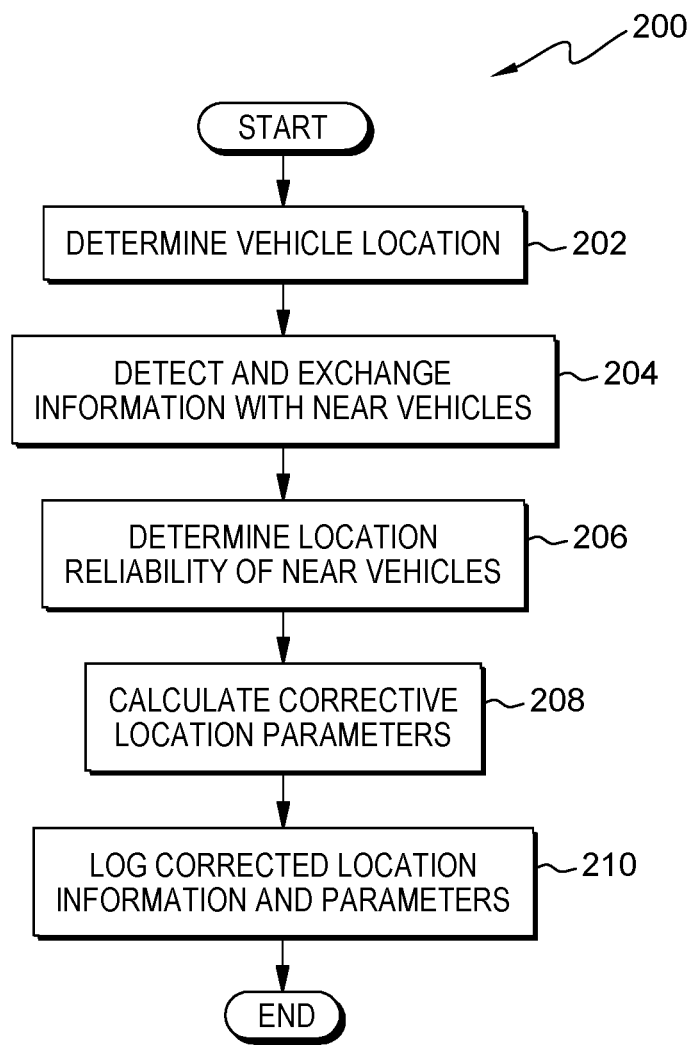
FIG. 2 is a flowchart depicting operational steps of a program, on a server computer within the data processing environment of FIG. 1, for adjusting inconsistencies and inaccuracies in location perception, in accordance with an embodiment of the present invention.

FIG. 2 is a flowchart depicting operational steps of program 150 for adjusting inconsistencies and inaccuracies in vehicle location perception, in accordance with an embodiment of the present invention.

Program 150 determines vehicle location (step 202). In an embodiment, program 150 determines an initial vehicle location when the user commences a scheduled trip. In another embodiment, program 150 receives a prompt from the user to begin determining vehicle location. For example, as the user begins a trip, the user signals program 150 to begin determining vehicle location. In a further embodiment, program 150 receives a notification that the user has entered a vehicle.

Program 150 utilizes sensors 114A to determine the location of the vehicle. In an embodiment, program 150 utilizes a GPS suite contained in sensors 114A to determine the location of the vehicle. In this embodiment, the location may be approximated to a geographical region such a country, state, city, and/or street. In another embodiment, program 150 utilizes a map application (not depicted) to calculate a map position and street position of the user. In one embodiment, program 150 utilizes said map application to determine the specific street address of the user. In another embodiment, program 150 determines the geographic region of the user, such as a city in the United States. For example, while a user is traveling, if program 150 cannot obtain an exact location, then program 150 calculates generalized cardinal directions until a specific location can be determined. In other embodiments, program 150 may utilize mobile phone tracking, via triangulation of radio signals between cell towers. In an example, the user may be walking down a city street with an associated client computing device (e.g., mobile device) and program 150 utilizes mobile phone tower triangulation to narrow the perceived location of said device. In another embodiment, program 150 may utilize video/image recognition to determine the location of the user. For example, as the user travels, program 150 determines the location of the user by analyzing the video stream from a front facing dashcam to identify street names, buildings, or landmarks. In another embodiment, program 150 may prompt the user to input the location. In some embodiments, program 150 may receive the location via metadata associated with the social networking posts and comments of the user. In various embodiments, program 150 receives location information and metadata from transponders or ad-hoc networks located near a street and/or road. In this embodiment, the transponders or ad-hoc networks may be located in street lights, street signs, mile marker posts, overpasses, parking meters, bus stops, and/or independent structures. For example, as a vehicle travels past said transponder or ad-hoc network, said vehicle receives a highly accurate location based on the absolute location of the transponder or ad-hoc network. In yet another embodiment, program 150 utilizes one or more cameras (not depicted) associated with one or more client computing devices to capture and identify (e.g., computer vision techniques, object recognition, motion estimation, etc.) objects or places associated with a highly accurate location information such as physical landmarks, buildings, monuments, and signs. Said location information may include longitude, latitude, and loxodrome coordinates, country/state/province/city information, and associated metadata.

In an embodiment, a management server (e.g., server computer 120) monitors the locations of one or more users and associated vehicles. Said management server notifies, transmits a message, or pings one or more users regarding potential encounters with other users which may have more accurate and reliable location information. In another embodiment, said management server estimates or predicts the future path of the user and creates a timing threshold where the management server anticipates two or more users and associated vehicles to encounter each other. For example, as a user is traveling, a management server notifies said user that another high reliability user will be approaching within two minutes. In an embodiment, the management server stores historically low accuracy areas and notifies approaching user and vehicles of the expected accuracy reduction.

In another embodiment, responsive to the level of location approximation obtained, program 150 calculates a location accuracy score. In this embodiment, the location accuracy score is a numerical value whereas the score increases, greater confidence is given towards said location accuracy score. For example, if program 150 could only determine the city that the vehicle is in, then program 150 calculates and assigns the location a low score. In another example, if program 150 determines the street and lane that the vehicle is traveling on, then program 150 may assign said location a high accuracy score. In various embodiments, program 150 utilizes sensors 114A and sensors 114B to determine the orientation (e.g., cardinal directions), speed, and acceleration of the vehicle. Program 150 determines an initial location reliability score based on the determined location. In an embodiment, an initial (e.g., no historical vehicle information) location reliability score is copied from the location accuracy score. Location reliability score represents the trustworthiness of the user and associated vehicles. In various embodiments, location reliability scores are numerical values (e.g., probabilistic). For example, a user may have a location reliability score of 85%, signifying that said user has a correct location 85% of the time. In an additional embodiment, program 150 incorporates historical vehicle information 124 when calculating a location reliability score. For example, if a vehicle or user has historically incorrect or inaccurate location information, then future location determinations are assigned a low location reliability score.

Program 150 detects and exchanges location information with near vehicles (step 204). Program 150 detects other vehicles near the user or the vehicle of the user. In an embodiment, program 150 utilizes vehicular communication systems and vehicular ad-hoc networks (VANETs) to communicate with all vehicles within a specified radius of the user. Near vehicles may be traveling in the same direction as the user, near vehicles may be traveling in the opposite direction of the user, or near vehicles may be stationary as the user travels past said near vehicles. In this embodiment, program 150 detects by pinging every vehicle as the user encounters said vehicles. Once another vehicle receives a ping, said vehicle may respond with an acknowledgement ping or initiate handshake authentication by transmitting a response along with an authentication request.

In an embodiment, program 150 receives digital images from one or more cameras (not depicted) attached to the vehicle or on one or more client computing devices associated with a user. Program 150 receives a field of view of the area surrounding the user and the vehicle of the user from a 360-degree perspective. For example, a 360-perspective of a vehicle displays all objects (e.g., vehicles, signs, monuments, etc.) within the immediate radius of the user. Program 150 receives digital images that pertain to the surroundings of client computing device 110 or other client computing devices associated with a user based on the field of view. In various embodiments, program 150 utilizes the aforementioned digital images to detect and identify near vehicles. In an embodiment, program 150 detects, requests, transmits, and replies to network requests, pings, and/or connection requests of one or more localized, near devices. In an example, as the user is walking through a city, an associated client computing device (e.g., mobile phone, tablet, etc.) broadcasts identifying information, allowing other devices to reply with corresponding device/user identifying information. In yet another embodiment, program 150 identifies available networks and associated devices utilizing detected transmissions, pings, and responses. In another embodiment, the user is a drone and program 150 detects and identifies near drones within a pre-defined three dimensional area constrained by one or more thresholds.

Responsive to detecting a near or within a predefined or dynamically adjusted distance threshold user and/or vehicle, program 150 transmits one or more instances of location information with said near vehicles and/or users. In an embodiment, program 150 utilizes one or more ad-hoc networks to initiate, facilitate, and manage the transfer and exchange of location information. In this embodiment, as detailed above, location information includes, but is not limited to, orientation, direction, speed, historical trip information, historical and current location reliability scores, historical and current location accuracy scores, and associated vehicle/user profiles. In an additional embodiment, program 150 exchanges a subset of the information contained in historical vehicle information 124 such as the history of the current trip or ride (e.g., speed, distances, utilized roads, additional encountered users, and vehicles). In a further embodiment, program 150 utilizes blockchain principles (e.g., decentralized ledgers, vehicle to vehicle networks, confirmation of reliability scores, confirmation of locations, etc.) to coordinate and manage the transfer of historical trip, ride, and location information. For example, as a vehicle communicates with other vehicles, program 150 adds historical entries into the blockchain ledger and exchanges the entire ledger to every encountered vehicle and/or user.

Program 150 determines location reliability of near vehicles (step 206). In an embodiment, responsive to detecting one or more near (e.g., within a predetermined radius, within signal radius, etc.) vehicles, identifies said near vehicles and associated users by exchanging one or more messages with said vehicles. Said messages may include user identification information, location information, historical location reliability scores, and historical location accuracy scores. In various embodiments, program 150 contacts a management server (e.g., server computer 120) to retrieve the current and historical location reliability scores of an identified near vehicle and associated user. In another embodiment, program 150 stores and maintains a local copy or version of the reliability score on one or more client computing devices associated with the user or the vehicle of the user. For example, as two vehicles encounter each other, localized location reliability and accuracy scores are exchanged along with related location information and associated data.

In another embodiment, program 150 calculates and determines a location reliability score by comparing the determined location of the user with encountered high accuracy and high reliability vehicles. In this embodiment, program 150 utilizes the one or more tests to create or adjust a location reliability score, where the score is increased or decreased based on the number of passed tests and/or the degree of error (location differences (e.g., coordinates, distance, etc.)) depicted in the results of the tests. In another embodiment, program 150 increases or decreases a reliability score based on the frequency and magnitude of inaccurate or incorrected determined locations. In yet another embodiment, program 150 tests the location reliability of a specific vehicle and user by administering and conducting one or more reliability tests where program 150 compares the perceived location of the user with an absolute location. The difference between the locations is scaled and then converted into a score as described above. In an embodiment, as a user or vehicle approaches a historical low accuracy area or region, program 150 determines one or more vehicles or users that will approach the user or that are within a predefined threshold distance. In another embodiment, program 150 ranks the determined approaching or near vehicles based on current and historical reliability scores and/or current and historical accuracy scores. In this embodiment, program 150 may assign each approaching or near vehicle a numerical value allowing program 150 to select the highest ranked vehicle and associated profile information, location information, and historical information contained in historical vehicle information 124. Program 150 then notifies both users and associated vehicles of the impending information exchange.

Program 150 calculates corrective location parameters (step 208). As vehicles encounter each other, location accuracy, reliability information, and scores are transmitted, exchanged, stored, and utilized to calculate location corrective parameters. In an embodiment, location corrective parameters include, but are not limited to, coordinates of the location, speed and orientation of the exchanging vehicle, and historical trip/ride routes and pathing. In another embodiment, location corrective parameters are modified relative to the lesser accuracy user. For example, in the situation where a low accuracy vehicle is traveling in the opposite direction of a near high accuracy vehicle, program 150 exchanges and incorporates the location information from the high accuracy vehicle and modifies said information in the perspective (e.g., reversal of cardinal directions, calculating and utilizing the speed differences of each vehicle, utilizing historical determined locations in the region/area, etc.) of the vehicle traveling in the opposite direction. In another embodiment, location corrective parameters include deviation factors which contain one or more differences between the received location information and the location information perceived by the user and the associated client computing devices of the user. In this embodiment, said deviation factors may include a confidence value derived from one or more instances of location information, associated accuracy and reliability scores. In a further embodiment, program 150 weights one or more values contained in one or more instances of location information allowing dynamic modification of location information.

In various embodiments, program 150 compares the determined location, as detailed in step 202, with an absolute location (e.g., a location where the location accuracy is at a maximum value (e.g., roadside location transponders, location relative to known stationary object, etc.)). In this embodiment, program 150 calculates a location accuracy and a location reliability score based on the level of difference between the absolute location and the determined (e.g., perceived location) of the vehicle and/or user. In an embodiment, program 150 only utilizes location information from vehicles with a higher or larger location reliability score. In another embodiment, a management server utilizes ranked near vehicles to determine the order and the degree of significance a specific instance of location information should command based on reliability scores, accuracy scores, and historical user and vehicle (e.g., client computing device) profiles. In yet another embodiment, program 150 attaches higher weights proportional to a reliability score and/or accuracy score. In various embodiments, program 150 continues to utilize transferred location information to calculate navigation if the vehicle continues to be unable to receive or determine a high accuracy location. For example, program 150 calculates a future path of a vehicle utilizing an exchanged relative location information and monitoring one or more changes to sensors 114A and sensors 114B. In various embodiments, two or more similarly reliable and accurate user (e.g., vehicles) may exchange location information, including historical location information, to increase the accuracy of predicted future locations or routes. For example, in the situation where two vehicles are traveling in opposite directions, program 150 may predict that a vehicle will encounter a location previously traveled by another vehicle. In an embodiment, responsive to the user or an associated client computing device containing no location information nor an associated client computing device, program 150 receives and accepts any available location information, regardless of the associated accuracy and reliability scores. In another embodiment, program 150 utilizes multiple detected users and associated client computing devices and aggregates the received location information.

Program 150 logs corrected location information and parameters (step 210). Program 150 periodically transmits and stores intermittent user and vehicle locations, location accuracy scores, location reliability scores, and associated geolocation data. In an embodiment, program 150 associates the aforementioned information with a user and associated vehicle profile (e.g., client computing device profile). In an embodiment, program 150 updates one or more client computing devices (e.g., mobile devices, etc.) with the corrected location or parameters necessary for location correction. In another embodiment, program 150 updates the user and vehicle location contained within a map/navigation application. In this embodiment, program 150 may update the user profile and parameters with the results of the completed trip. For example, when the trip (e.g., user exits the vehicle, shuts off navigation system, etc.) completes, program 150 utilizes the trip information (e.g., determined locations, historical locations, associated reliability and accuracy scores, and related metadata) and adjusts user and vehicle scores/parameters accordingly. In another embodiment, program 150 may adjust location accuracy and reliability scores base on transmitted user feedback via a graphical user interface (not depicted). For example, after program 150 determines a trip has completed, the passenger can provide feedback for the trip. Feedback may include a simple positive or negative response such as "the determined location was incorrected" or "the determined location was highly accurate". Feedback may also include detailed responses such as a "the location was off by 14 miles" response or "the location was accurate to the lane in the street" response. In an embodiment, program 150 creates low accuracy/reliability "heat" maps, allowing program 150 to identify common inaccurate areas and regions.

Figure 3:
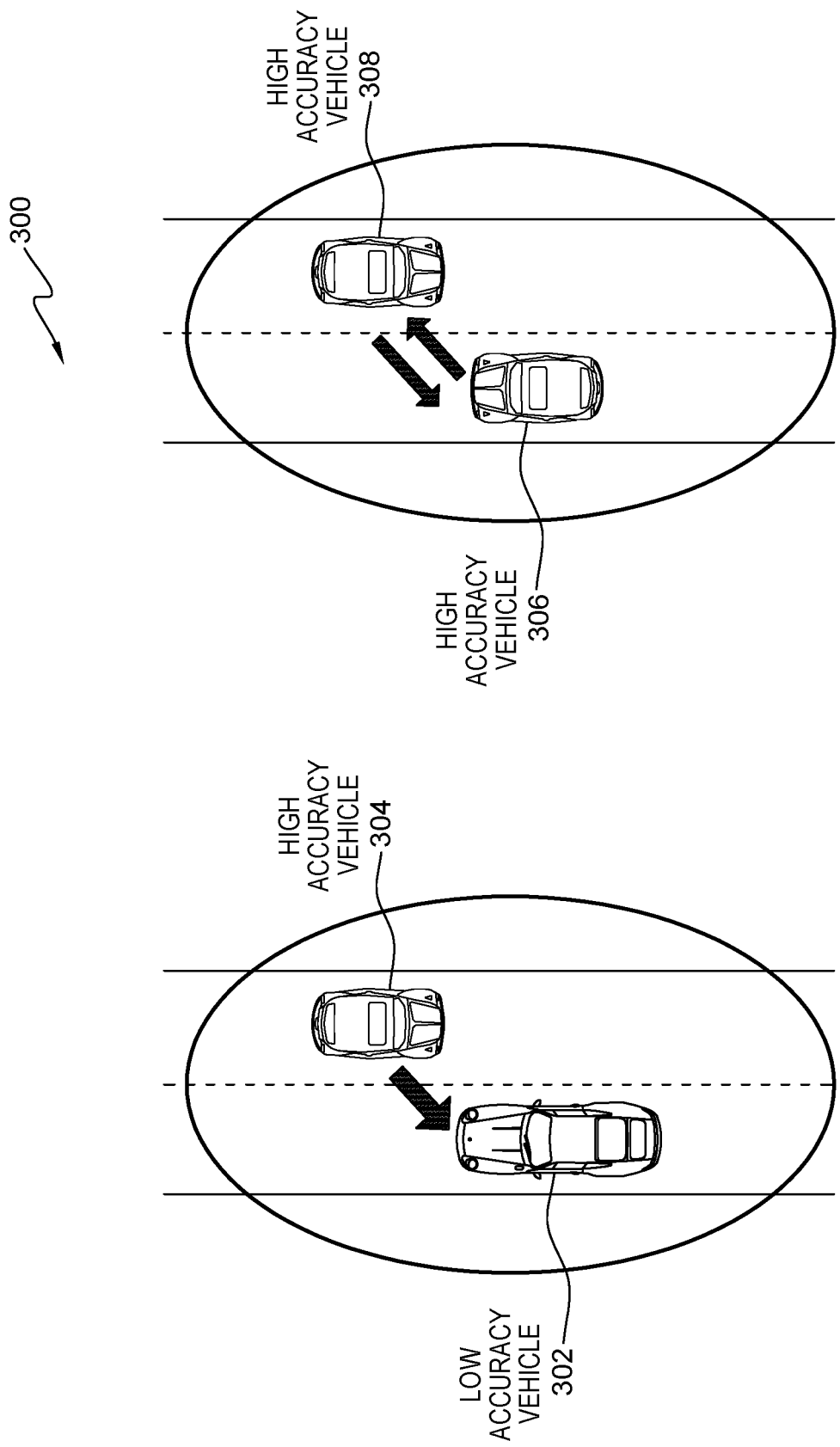
FIG. 3 depicts example 300, containing two example vehicle situations, in accordance with an embodiment of the present invention.

FIG. 3 depicts example 300, containing example embodiments of the present invention. Example 300 includes low accuracy vehicle 302, a vehicle with a low location accuracy score, and high accuracy vehicle 304, 306, and 308, vehicles with, respectively, associated high location accuracy scores.

In a detailed example of flowchart 200, a user named Andy commences a trip, in a car, within New York City utilizing GPS navigation and a mobile device. As Andy continues the trip, Andy encounters areas of New York City where the navigation system is incorrectly determining his location or determining a location confined imprecisely to a large area. Program 150 identifies this historically low location accuracy area and proceeds to detect and contact near vehicles that may contain relevant high accuracy location information and associated data. Once detected, program 150 retrieves associated location reliability scores and ranks said vehicles with higher reliability scores than low reliability score vehicles. As the vehicles near, program 150 creates one or more ad-hoc networks, allowing each vehicle the ability to communicate and exchange location information, historical location information, user and vehicle profiles, accuracy scores, and reliability scores. Program 150 modifies the exchanged location information to the perspective of the receiving vehicle, allowing program 150 to calculate relevant and vehicle specific location parameters in order to determine a highly accurate location. If the exchanged location information does not improve the location accuracy/awareness of the vehicle or user, then program 150 discards said parameters and information and reduces the reliability score of the information providing vehicle. After program 150 calculates the location correction parameters, program 150 updates one or more associated user and vehicle profiles, adjusting accuracy and reliability scores, and adding/removing historical location information.

Figure 4:
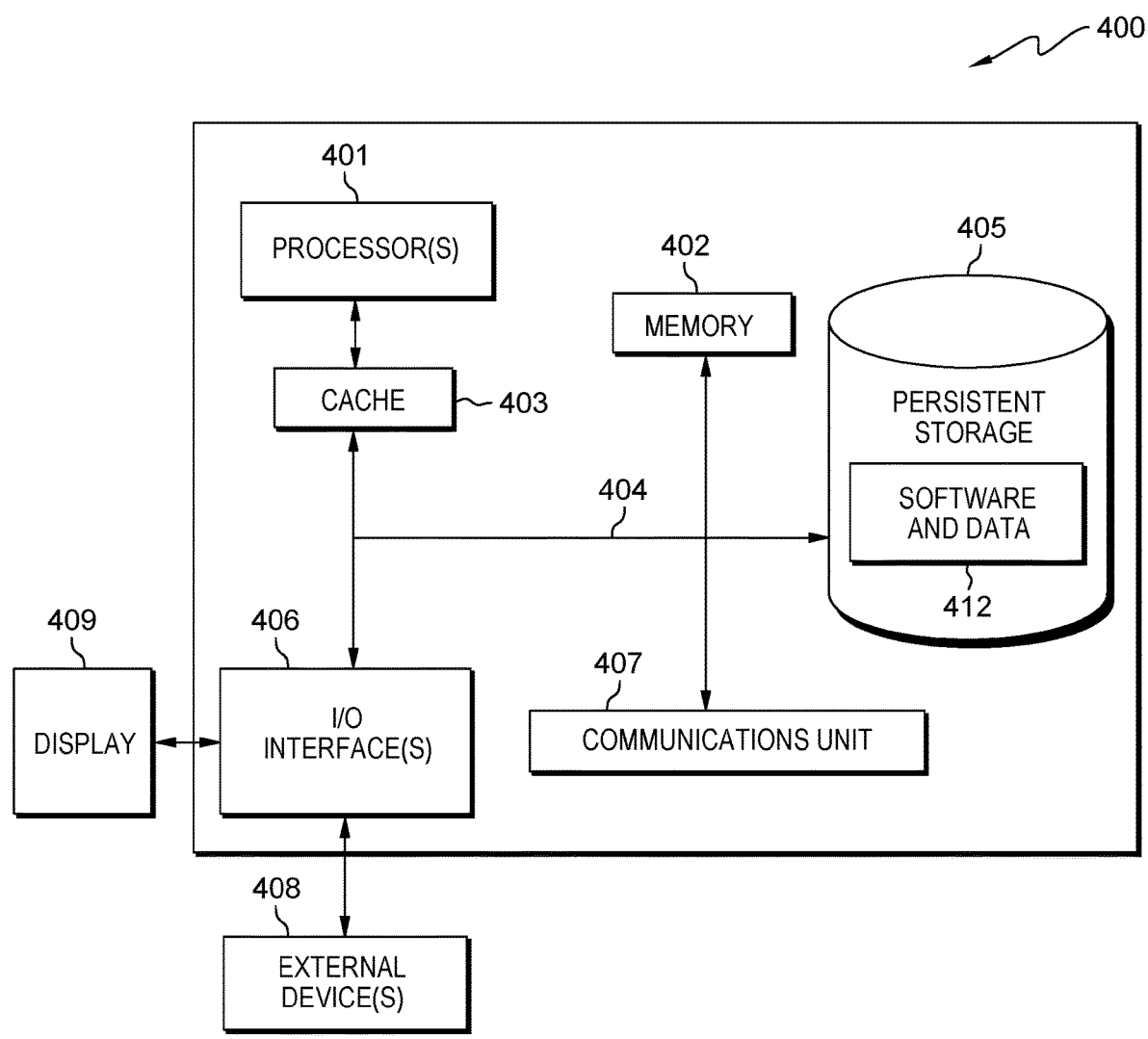
FIG. 4 is a block diagram of components of the server computer executing the program, in accordance with an embodiment of the present invention.

FIG. 4 depicts a block diagram of components of client computing device 110, client computing device 112, and server computer 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 120 includes communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Program 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 can be stored in persistent storage 405 for access and/or execution by one or more of the respective processors 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program 150 may be downloaded to persistent storage 405 through communications unit 407.

I/O interface(s) 406 allows for input and output of data with other devices that may be connected to client computing device 110. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, quantum programming languages such as the "Q" programming language, Q #, quantum computation language (QCL) or similar programming languages, low-level programming languages, such as the assembly language or similar programming languages, and generic macros or the like. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   determining, by one or more computer processors, a level of location approximation of a traveling vehicle, wherein the level of location approximation is an approximation to a geographical region, wherein the geographical region comprises a country, state, city, or street;
   responsive to the determined level of location approximation of the traveling vehicle, calculating, by one or more computer processors, a location accuracy score associated with the determined level of location approximation and a first location reliability score representing trustworthiness of the traveling vehicle, wherein a low location reliability score incorporates historically incorrect or inaccurate location information;
   creating, by one or more computer processors, a timing threshold utilizing a predicted path for the traveling vehicle and one or more subsequent vehicles, wherein the time threshold anticipates an encounter between the vehicle and one or more subsequent vehicles;
   detecting, by one or more computer processors, one or more subsequent vehicles of the plurality of subsequent vehicles within a communication proximity and the created timing threshold to the traveling vehicle;
   notifying, by one or more computer processors, a user associated with the traveling vehicle of an approaching high reliability subsequent vehicles, an expected accuracy reduction, and an impending information exchange;
   receiving, by one or more computer processors, location information associated with each of the one or more detected vehicles through one or more vehicular ad-hoc networks;
   determining, by one or more computer processors, a second location reliability score for the one or more detected vehicles based on the received location information
   calculating, by one or more computer processors, one or more location corrective parameters for the traveling vehicle based, at least in part, on the level of location approximation of the traveling vehicle, the received location information of the one or more detected vehicles, the first location reliability score, and the second location reliability score;
   adjusting, by one or more computer processors, the level of location approximation of the traveling vehicle based on the calculated one or more location corrective parameters; and
   adjusting, by one more computer processors, the first location reliability score based on a frequency and magnitude of inaccurate determined locations based on location information associated with detected vehicles with larger location reliability scores, wherein the magnitude is based on a comparison of the determined level of location approximation and an absolute location, wherein the absolute location are roadside location transponders or a location relative to known stationary object.

2. The method of claim 1, wherein calculating one or more location corrective parameters for the vehicle based, at least in part, on the identified data indicating the location of the vehicle, the received data indicating the location of the one or more subsequent vehicles, the first location reliability score, and the second location reliability score, further comprises:
   calculating, by one or more computer processors, one or more weights based on the first location reliability score and second location reliability score;
   adjusting, by one or more computer processors, the received data indicating the location of the one or more subsequent vehicles based on the calculated one or more weights;
   determining, by one or more computer processors, a relative orientation of the vehicle based on the identified data indicating the location of the vehicle and the adjusted data indicating the location of the one or more subsequent vehicles;
   determining, by one or more computer processors, a relative speed of the vehicle based on the identified data indicating the location of the vehicle and the adjusted data indicating the location of the one or more subsequent vehicles;

calculating, by one or more computer processors, the location of the vehicle based on the determined relative speed, determined relative orientation, the identified data indicating the location of the vehicle, the received data indicating the location of the one or more subsequent vehicles, and historical locations of the one or more subsequent vehicles; and generating, by one or more computer processors, one or more corrective parameters based on the calculated location of the vehicle.

3. The method of claim 1, wherein adjusting the data indicating the location of the vehicle based on the calculated one or more location corrective parameters, further comprises:

applying, by one or more computer processors, the one or more location corrective parameters to one or more navigation systems.

4. The method of claim 1, wherein receiving data indicating the location of the one or more subsequent vehicles through one or more vehicular ad-hoc networks, further comprises:

receiving, by one or more computer processors, one or more distributed ledgers containing one or more historically determined locations, associated location accuracy scores, and associated location reliability scores; and storing, by one or more computer processors, the received one or more distributed ledgers on one or more vehicles.

5. The method of claim 1, wherein determining the first location reliability score for the identified data indicating the location of the vehicle and the second location reliability score for the received data indicating the location of the one or more subsequent vehicles, further comprises:

retrieving, by one or more computer processors, one or more user profiles, computing device profiles, historical locations, historical routes, and associated historical reliability scores; and determining, by one or more computer processors, the first location reliability score and the second reliability score based, at least in part, on the retrieved user profiles, computing device profiles, historical locations, historical routes, and associated historical reliability scores.

6. The method of claim 1, further comprises:

logging, by one or more computer processors, the one or more calculated corrective parameters and the adjusted data indicating the location into a management server; and associating, by one or more computer processors, the logged corrective parameters and data indicating the location to one or more user profiles and computing device profiles.

7. A computer program product comprising:

one or more computer readable storage media and program instructions stored on the one or more computer readable storage media, the stored program instructions comprising:

program instructions to determine a level of location approximation of a traveling vehicle, wherein the level of location approximation is an approximation to a geographical region, wherein the geographical region comprises a country, state, city, or street;

program instructions to, responsive to the determined level of location approximation of the traveling vehicle, calculate a location accuracy score associated with the determined level of location approximation and a first location reliability score representing trustworthiness of the traveling vehicle, wherein a low location reliability score incorporates historically incorrect or inaccurate location information;

program instructions to create a timing threshold utilizing a predicted path for the traveling vehicle and one or more subsequent vehicles, wherein the time threshold anticipates an encounter between the vehicle and one or more subsequent vehicles;

program instructions to detect one or more subsequent vehicles of the plurality of subsequent vehicles within a communication proximity and the created timing threshold to the traveling vehicle;

program instructions to notify a user associated with the traveling vehicle of an approaching high reliability subsequent vehicles, an expected accuracy reduction, and an impending information exchange;

program instructions to receive location information associated with each of the one or more detected vehicles through one or more vehicular ad-hoc networks;

program instructions to determine a second location reliability score for the one or more detected vehicles based on the received location information program instructions to calculate one or more location corrective parameters for the traveling vehicle based, at least in part, on the level of location approximation of the traveling vehicle, the received location information of the one or more detected vehicles, the first location reliability score, and the second location reliability score;

program instructions to adjust the level of location approximation of the traveling vehicle based on the calculated one or more location corrective parameters; and program instructions to adjust the first location reliability score based on a frequency and magnitude of inaccurate determined locations based on location information associated with detected vehicles with larger location reliability scores, wherein the magnitude is based on a comparison of the determined level of location approximation and an absolute location, wherein the absolute location are roadside location transponders or a location relative to known stationary object.

8. The computer program product of claim 7, wherein calculating one or more location corrective parameters for the vehicle based, at least in part, on the identified data indicating the location of the vehicle, the received data indicating the location of the one or more subsequent vehicles, the first location reliability score, and the second location reliability score, further comprises:

program instructions to calculate one or more weights based on the first location reliability score and second location reliability score;

program instructions to adjust the received data indicating the location of the one or more subsequent vehicles based on the calculated one or more weights;

program instructions to determine a relative orientation of the vehicle based on the identified data indicating the location of the vehicle and the adjusted data indicating the location of the one or more subsequent vehicles;

program instructions to determine a relative speed of the vehicle based on the identified data indicating the location of the vehicle and the adjusted data indicating the location of the one or more subsequent vehicles;

program instructions to calculate the location of the vehicle based on the determined relative speed, determined relative orientation, the identified data indicating the location of the vehicle, the received data indicating the location of the one or more subsequent vehicles, and historical locations of the one or more subsequent vehicles; and program instructions to generate one or more corrective parameters based on the calculated location of the vehicle.

9. The computer program product of claim 7, wherein adjusting the data indicating the location of the vehicle based on the calculated one or more location corrective parameters, further comprises:

program instructions to apply the one or more location corrective parameters to one or more navigation systems.

10. The computer program product of claim 7, wherein receiving data indicating the location of the one or more subsequent vehicles through one or more vehicular ad-hoc networks, further comprises:

program instructions to receive one or more distributed ledgers containing one or more historically determined locations, associated location accuracy scores, and associated location reliability scores; and program instructions to store the received one or more distributed ledgers on one or more vehicles.

11. The computer program product of claim 7, wherein determining the first location reliability score for the identified data indicating the location of the vehicle and the second location reliability score for the received data indicating the location of the one or more subsequent vehicles, further comprises:

program instructions to retrieve one or more user profiles, computing device profiles, historical locations, historical routes, and associated historical reliability scores; and program instructions to determine the first location reliability score and the second reliability score based, at least in part, on the retrieved user profiles, computing device profiles, historical locations, historical routes, and associated historical reliability scores.

12. The computer program product of claim 7, further comprises:

program instructions to log the one or more calculated corrective parameters and the adjusted data indicating the location into a management server; and program instructions to associate the logged corrective parameters and data indicating the location to one or more user profiles and computing device profiles.

* * * * *